US006704481B2

(12) United States Patent
Gaillard et al.

(10) Patent No.: US 6,704,481 B2
(45) Date of Patent: Mar. 9, 2004

(54) CABLE ASSEMBLY HAVING RIPCORDS WITH EXCESS LENGTH AND RIPCORDS ATTACHED TO TAPE

(75) Inventors: Pierre Gaillard, Calais (FR); Stefan Richter, Hickory, NC (US); Matthew Barber, Mooresville, NC (US); Christopher L. Johnson, Granite Falls, NC (US); Geoffrey Witt, Hickory, NC (US)

(73) Assignee: Alcatel, Paris (FR)

( * ) Notice: Subject to any disclaimer, the term of this patent is extended or adjusted under 35 U.S.C. 154(b) by 71 days.

(21) Appl. No.: 09/750,339

(22) Filed: Dec. 29, 2000

(65) Prior Publication Data

US 2002/0085820 A1 Jul. 4, 2002

(51) Int. Cl.[7] .................................................. G02B 6/44
(52) U.S. Cl. ...................................................... 385/113
(58) Field of Search ................................ 385/100, 106, 385/109, 112

(56) References Cited

U.S. PATENT DOCUMENTS

| | | | | | |
|---|---|---|---|---|---|
| 3,937,559 | A | | 2/1976 | Ferrentino et al. | 350/96 WA |
| 4,090,902 | A | | 5/1978 | Ferrentino et al. | 156/177 |
| 4,237,337 | A | | 12/1980 | Serrander | |
| 5,173,961 | A | | 12/1992 | Chiasson | 385/113 |
| 5,268,971 | A | * | 12/1993 | Nilsson et al. | 385/101 |
| 5,384,880 | A | * | 1/1995 | Keller et al. | 385/109 |
| 5,457,285 | A | | 10/1995 | Faust et al. | |
| 5,651,081 | A | | 7/1997 | Blew et al. | 385/101 |
| 5,761,362 | A | | 6/1998 | Yang et al. | 385/109 |
| 5,822,484 | A | * | 10/1998 | Arroyo | 385/101 |
| 6,052,502 | A | | 4/2000 | Coleman | 385/114 |
| 6,256,438 | B1 | * | 7/2001 | Gimblet | 385/109 |

FOREIGN PATENT DOCUMENTS

| | | | |
|---|---|---|---|
| WO | WO 92/09089 | A1 | 5/1992 |

* cited by examiner

*Primary Examiner*—Javaid H. Nasri
(74) *Attorney, Agent, or Firm*—Sughrue Mion, PLLC

(57) ABSTRACT

The invention is a cable assembly in which the ripcord is bonded or woven to the cable assembly's armor tape. This arrangement helps to prevent the ripcords from moving from their initial position, therefore allowing better dissection of a cable sheath and/or jacket. The cable assembly includes a cable core (e.g., soft buffer tubes surrounding optical fibers), a tape surrounding the cable core, at least one ripcord attached to the tape, and a cable jacket surrounding the tape. In a second embodiment of the present invention, a cable assembly includes a cable core having a predetermined axial length, a cable jacket for housing the cable core along the predetermined axial length of the cable core, and a ripcord disposed between the cable core and the cable jacket along the predetermined axial length, in a manner that the ripcord is contained within the predetermined axial length, but the ripcord has a length substantially longer that the predetermined axial length. In a preferred embodiment of the present invention, the ripcord is disposed along the predetermined axial length in a wavy shape, thus the ripcord is made "flexible", alleviating damage to the cable assembly that can occur from ripcord tension.

9 Claims, 3 Drawing Sheets

CABLE ASSEMBLY HAVING RIPCORDS WITH EXCESS LENGTH AND RIPCORDS ATTACHED TO TAPE

BACKGROUND OF THE INVENTION

1. Field of Invention

This invention relates to a cable assembly in which removal of the protective jacket or sheath can be facilitated by having the ripcords attached to a tape in the cable assembly, which provides access to the underlying core. The ripcords placement in the cable assembly is also used as means for improving the ability of the cable assembly to withstand bending by using ripcords with excess length. The invention is particularly useful in optical cable assemblies, which have a tendency to be crush sensitive, and also other telecommunications cable assemblies including those containing fragile elements, such as copper wires insulated with thin, low resistance plastic such as cellular Pe.

2. Related Art

Ripcords are used within a cable assembly to facilitate removal of a protective jacket or sheath, thus allowing direct access to the cable cores. Ripcords are generally introduced under the armor at the forming station (armored cables) or over the cable core at the jacket extruder head (dielectric cables) during the manufacture of a cable. The ripcords are disposed through the cable longitudinally or in a helical fashion having a long pitch. When two ripcords are provided, they are typically aligned to be 180 degrees apart, thereby potentially allowing for the cable jacket or sheath to be perfectly bisected. However, maintaining the position of the ripcords at 180 degrees becomes difficult during the manufacture of the cable assembly. Difficulties in maintaining the position of the ripcords can be, among other things, caused by core rotation relative to the armor, armor rotation relative to the cable sheath, intermittent sticking and slipping between the ripcords and the armor as the armor is formed, and/or inadequate ripcord pay-off tension.

The movement of the ripcords out of their initial position reduces functionality of the ripcord for a number of reasons. Among these reasons, ripcords that become positioned too close to the sharp edges of armor tape used in the manufacture of the cable can be cut, or they can “escape” from their desired location from under to over the armor. Also, if the ripcords move very close to each other, only a narrow slot (if no slot at all, as the second ripcord will slide through the opening created by the first one) is cut through the jacket or sheath, thus making extraction of the cable core very difficult.

A second problem in the prior art arises when the cable becomes bent. In this situation, ripcords that do not have excess length (that is, ripcords with a length that is nearly equal to the cable length) and which are not located on a neutral axis of the cable, are subjected to forces which tend to pull the ripcord toward the neutral axis of the cable. This stress of the ripcord may squeeze the cable core and damage, for example, the buffer tubes or optical fibers underneath, possibly causing attenuation increase or mechanical damage to the fiber coating. This is more particularly likely to happen in cable structures that have a tight fit between the core and the sheath/jacket, thus limiting the possibilities for the ripcord to move around the core to reach the cable neutral bending plane. The present invention overcomes these problems.

BRIEF SUMMARY OF THE INVENTION

It is an object of the present invention to provide a cable assembly in which the ripcords are attached to the tape by, for example, bonding or weaving the ripcords to the tape, thus preventing movement of the ripcords from their initial position.

It is another object of the invention to provide a cable assembly having at least one ripcord with excess length disposed in the cable, which allows bending of the cable assembly with reduced ripcord tension.

Accordingly, the present invention provides a cable assembly comprising a cable core, a tape surrounding the cable core, at least one ripcord attached to the tape, and a cable jacket surrounding the tape. In addition to the cable jacket, the present invention can include a cable sheath disposed between the tape and the cable jacket for providing further protection to the cable core. As an example, a jacket referred to in this context can be a simple extruded plastic layer, while a sheath can represent a more complex protection (e.g., a sheath with additional reinforcement, such as an armor, a tape, or mechanical reinforcement). More particularly, the present invention comprises a cable assembly wherein the ripcord is attached to the tape by bonding or weaving the ripcord to the tape, thus providing for more secure placement of the ripcord and providing additional strength to the tape.

In a second embodiment of the present invention, a cable assembly comprises a cable core having a predetermined axial length, a cable jacket for housing the cable core along the predetermined axial length of the cable core, and a ripcord disposed between the cable core and the cable jacket along the predetermined axial length, in a manner that the ripcord is contained within the predetermined axial length, but the ripcord has a length substantially longer that the predetermined axial length. In a preferred embodiment of the present invention, the ripcord is disposed along the predetermined axial length in a wavy shape, for example sinusoidal, thus the ripcord is made “flexible”, alleviating damage to the cable assembly that can occur from ripcord tension created by bending. When the cable returns from its bent position to a straight position, the ripcords can move back to their original path or locally buckle to accommodate a different path as they usually have a flexural stiffness that is low enough to easily allow this.

DETAILED DESCRIPTION OF THE PREFERRED EMBODIMENT

Figure 1:
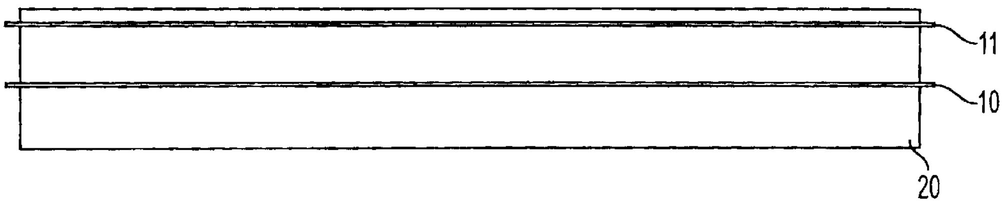
FIG. 1 is a diagram illustrating a section of tape with two ripcords positioned and bonded to the tape.

The present invention allows for the ripcord location to be tightly controlled, which allows a jacket or sheath of a cable assembly to be bisected, and therefore, easy extraction of the cable core. FIG. 1 depicts a section of tape in which two ripcords are attached to the tape. More specifically, in FIG. 1, ripcord 10 and ripcord 11 are bonded to the tape 20 using an adhesive, chemical adhesion method, or a melting technique. The tape 20 used in a cable assembly can be of several types such as, for example, steel, paper, water swellable, heat-barrier, etc., these tapes being coated or not. In another embodiment of the present invention, ripcords 10 and 11 can be woven, instead of bonded, to tape 20. Weaving of the ripcord to the tape could take place during the manufacture of the tape, or by employing separate weaving processes tailored to the type of tape that is used.

By having the ripcords bonded or woven to the tape, the ripcords 10 and 11 are prevented from moving from their initial position. Therefore, the removal of a protective jacket or sheath is facilitated, and direct access to the cable cores can be obtained. One additional benefit of having the ripcords 10 and 11 bonded or woven to the tape 20 is that the ripcords 10 and 11 also carry a part of the tensile load of the tape, accordingly, providing a strength feature to the tape.

For a cable assembly using a laminated tape, e.g., a water-swellable tape, the tape contains at least two tape layers with for example, water swellable powder used in between the layers of the tape. When this type of tape is used, the ripcords 10 and 11 can be placed between the laminated layers, additionally providing strength to the tape 20.

Figure 2A:
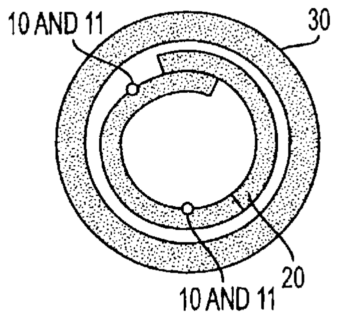
FIG. 2*a* is a diagram illustrating a cross-section of a cable assembly using the tape of FIG. 1 wherein ripcords are attached to the inside and outside of the tape.
Figure 2B:
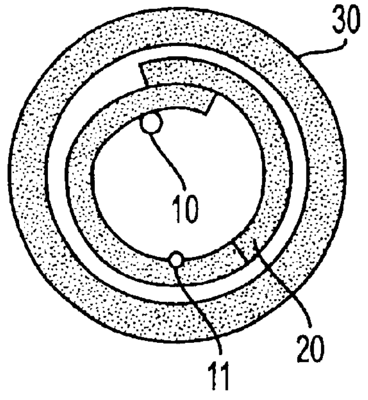
FIG. 2*b* is a diagram illustrating a cross-section of a cable assembly using the tape of FIG. 1 wherein ripcords are attached to the inside of the tape.

FIGS. 2*a* and 2*b* illustrate a cross-section of a cable assembly of a preferred embodiment of the present invention, and depict how the tape 20 from FIG. 1 is placed and used in the cable assembly. Depending on the application, the ripcords 10 and 11 can be attached to the inside or the outside of the tape 20, or a combination thereof. FIG. 2*a* depicts ripcord 10 attached to the outside of tape 20, while ripcord 11 is attached to the inside of tape 20. Alternatively, FIG. 2*b* illustrates a cable assembly in which both ripcords 10 and 11 are attached to the inside of tape 20. In both FIGS. 2*a* and 2*b*, cable jacket 30 surrounds tape 20, providing protection to the cable core (not shown). The application of the ripcords 10 and 11 attached to the tape 20 is not particular to a cable design, but, could be used in most cable designs in which access to the cable is obtained by ripping an outer sheath or jacket 30. Also as shown in FIGS. 2*a* and 2*b*, ripcord 10 is aligned to be spaced apart from ripcord 11 (typically between 90 and 180 degrees), thereby allowing for bisection of the cable jacket 30.

Figure 3:
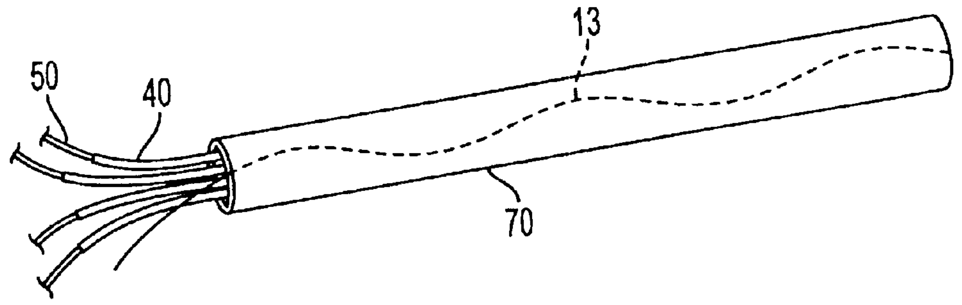
FIG. 3 is a diagram illustrating a ripcord with excess length having the ripcord in a wavy shape.
Figure 4:
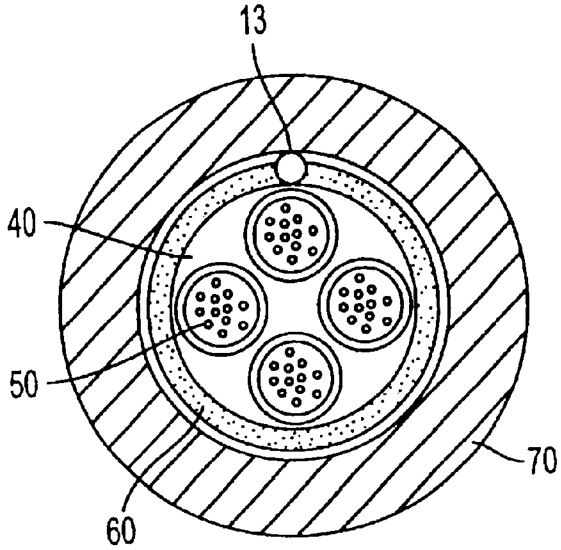
FIG. 4 is a diagram depicting a cross-section of a cable assembly using a ripcord with excess length and “soft” buffer tubes.

Another embodiment of the present invention is shown in FIGS. 3 and 4. In FIGS. 3 and 4, the ripcord 13 has excess length which allows for bending of the cable assembly with reduced or negligible ripcord tension. In this embodiment, as shown in detail in FIG. 4, the ripcord 13 is placed between "soft" buffer tubes 40 surrounding optical fibers 50, and the outer sheath 70. The excess length should be large enough to absorb strains caused on the ripcord by cable bending. In a preferred embodiment shown in FIG. 3, the ripcord 13 is placed with low tension to run interior to the outer sheath 70 in a wavy shape (nearly sinusoidal in FIG. 3). This wavy shape can be generated by a guiding die inserting the ripcord 13, where the guiding die is moved back and forth perpendicular to the cable assembly axis. An improvement of this technique could consist of bonding or gluing the ripcord on the tape following this wavy pattern so that the influence of the ripcord pay-off tension is minimized. An alternative solution to introduce overlength is to apply the ripcord with a low tension and stretch the core so that excess length is generated through relaxation of the core to generate the desired excess length due to the core relaxation. Using a ripcord with excess length enables a cable assembly to be bent without concern for damage to the cable core resulting from ripcord tension. Therefore, cable reliability can be improved during cable deployment and application, which promotes the use of ripcords in cable designs having soft cores of buffer tubes 40, e.g., FlexTube. In addition, in a further embodiment as shown in FIG. 4, the ripcord 13 can be attached to a core wrapping 60, which can be the tape as described above. Also, additional ripcords could be used, with the ripcords bonded or woven to the tape.

While the present invention has been described with what presently is considered to be the preferred embodiments, the claims are not to be limited to the disclosed embodiments. Variations can be made thereto without departing from the spirit and scope of the invention.

What is claimed is:

1. A cable assembly comprising:

a cable core;

a tape surrounding said cable core;

at least one ripcord attached to said tape by bonding said ripcord to a tape structure of said tape; and a cable jacket surrounding said tape;

wherein said ripcord is attached to said tape in a wavy shape and at least one wavelength of the wavy shape is provided interior to the tape.

2. A cable assembly according to claim 1, wherein said ripcord is bonded to said tape by gluing said ripcords to said tape.

3. A cable assembly according to claim 1, wherein said ripcord is bonded to said tape by weaving said ripcords into a tape structure of said tape.

4. A cable assembly according to claim 1, wherein said cable core includes optical fibers enclosed by soft buffer tubes.

5. A cable assembly comprising:

a cable core having a predetermined axial length;

a tape surrounding said cable core a cable jacket for housing said cable core and said tape along said predetermined axial length of said cable core;

a ripcord disposed along a surface of said tape and bonded thereto along said predetermined axial length of said cable core, in a manner that said ripcord is entirely contained within said predetermined axial length, but said ripcord having a length substantially longer than said predetermined axial length;

wherein said ripcord is disposed along said predetermined axial length in a wavy shape and at least one wavelength of the wavy shape is provided interior to the tape.

6. A cable assembly according to claim 5, wherein said ripcord is woven into said tape.

7. A cable assembly according to claim 5, wherein at least two tape layers are laminated to form said tape, said ripcord being disposed between said at least two tape layers.

8. A cable assembly according to claim 7, wherein a water swellable material is disposed between said at least two tape layers.

9. A cable assembly according to claim 5, wherein said cable core includes optical fibers enclosed by soft buffer tubes.

* * * * *